(12) United States Patent
Wiltse

(10) Patent No.: US 8,591,048 B2
(45) Date of Patent: Nov. 26, 2013

(54) SPATIALLY EFFICIENT KINEMATIC MIRROR MOUNT

(75) Inventor: John M. Wiltse, Lake Oswego, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 433 days.

(21) Appl. No.: 12/610,068

(22) Filed: Oct. 30, 2009

(65) Prior Publication Data

US 2011/0102924 A1    May 5, 2011

(51) Int. Cl.
     *G02B 7/182*      (2006.01)

(52) U.S. Cl.
     USPC .......................................................... 359/871

(58) Field of Classification Search
     USPC ................... 359/871–876, 811, 819; 248/466
     See application file for complete search history.

(56) References Cited

U.S. PATENT DOCUMENTS

| | | | |
|---|---|---|---|
| 2,004,489 A * | 6/1935 | Kuhn ............................... | 42/126 |
| 3,316,052 A | 4/1967 | Ross | |
| 3,565,515 A | 2/1971 | de Mey, II | |
| 4,925,288 A | 5/1990 | Harris | |
| 5,052,793 A | 10/1991 | Lapp et al. | |
| 5,056,024 A * | 10/1991 | Stuyts ........................... | 701/32.9 |
| 5,400,184 A | 3/1995 | Kuklo | |
| 5,572,312 A * | 11/1996 | Karlsson et al. ................ | 356/46 |
| 5,694,257 A | 12/1997 | Arnone et al. | |
| 6,239,924 B1 * | 5/2001 | Watson et al. ................ | 359/819 |
| 6,400,516 B1 * | 6/2002 | Spinali ........................... | 359/819 |
| 6,543,740 B2 | 4/2003 | Gaunt et al. | |
| 7,471,541 B2 * | 12/2008 | Fong et al. .................... | 365/104 |
| 7,515,767 B2 * | 4/2009 | Miller et al. .................. | 382/274 |
| 2004/0008429 A1 | 1/2004 | Watson et al. | |
| 2005/0068641 A1 | 3/2005 | Eisenbies et al. | |
| 2009/0207511 A1 | 8/2009 | Schoeppach et al. | |

OTHER PUBLICATIONS

Young, Lee W., Authorized officer, International Searching Authority, International Search Report, PCT Application Serial No. PCT/US2010/55002; search mailing date: Jan. 4, 2011.

Young, Lee W., Authorized officer, International Searching Authority, Written Opinion of the International Searching Authority, PCT Application Serial No. PCT/US2010155002; search mailing date: Jan. 4, 2011.

* cited by examiner

*Primary Examiner* — Stephone Allen
*Assistant Examiner* — Tamara Y Washington
(74) *Attorney, Agent, or Firm* — Kolisch Hartwell, P.C.

(57) ABSTRACT

A spatially efficient kinematic mirror mount for mounting a mirror or other optical element to a housing. The kinematic mirror mount may include three spaced-apart constraint structures, positioned at or near the outer perimeter or circumference of the mirror. The constraint structures constrain the mirror to lie within a plane, typically the x-y plane defined by the orientation of the housing, substantially without over-constraining the mirror. To accomplish this, each of the three constraint structures may constrain the mirror in the x-y plane by independently providing a tangential constraint to the mirror. The constraint structures may include a tab, coupled to the mirror by a flexure, and a fastening assembly for securing the tab to the housing.

20 Claims, 4 Drawing Sheets

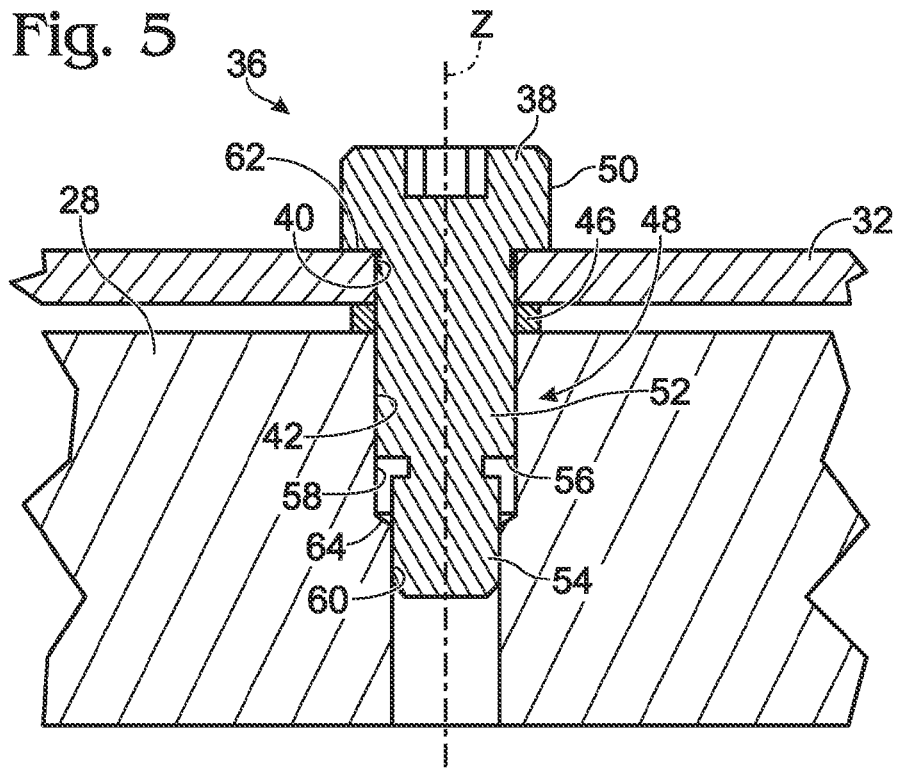
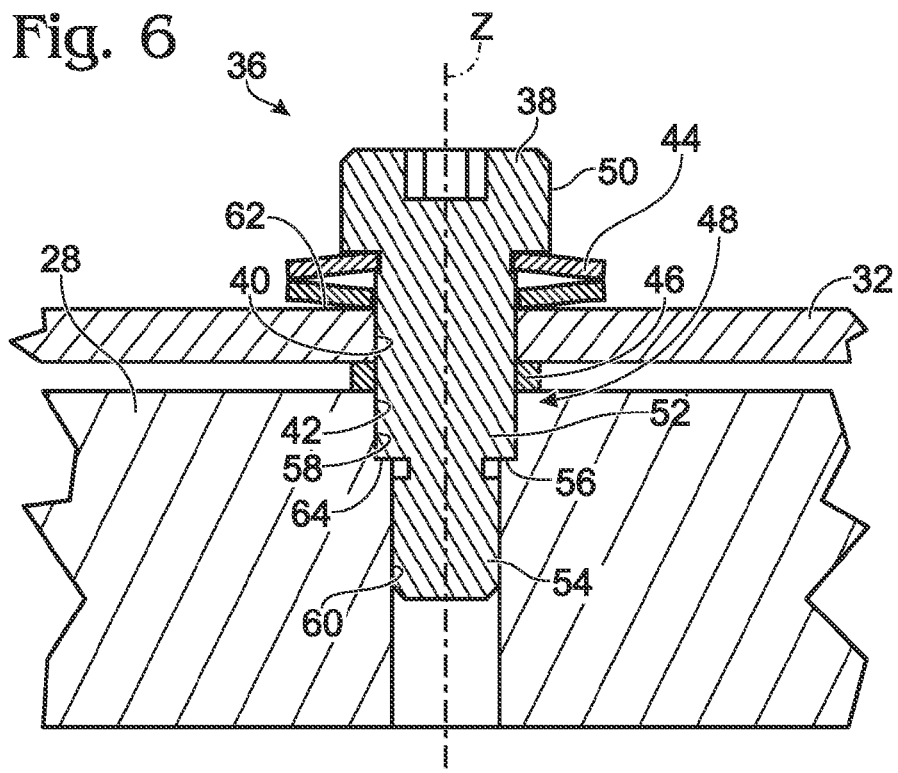

SPATIALLY EFFICIENT KINEMATIC MIRROR MOUNT

Optical systems are formed of two or more optical elements, such as mirrors and lenses, selected and arranged to create, and optionally to record, images of objects and scenes. These optical elements may be attached to a common housing by mounts. The housing may protect the optical elements and specify and maintain their relative positions and orientations, both with respect to each other and with respect to the housing.

In general, a rigid body in n dimensions has $n(n+1)/2$ degrees of freedom, consisting of n translations and $n(n-1)/2$ rotations. Thus, optical elements, like other rigid bodies, have six degrees of freedom in three dimensions (three translations and three rotations) and three degrees of freedom in two dimensions (two translations and one rotation). Accordingly, mounts with six constraints in three dimensions may constrain optical elements exactly, and mounts with three constraints in two dimensions may constrain optical elements exactly. Mounts with fewer constraints than the corresponding number of degrees of freedom will allow an optical element to move, leading to instabilities. On the other hand, mounts with more constraints than the corresponding number of degrees of freedom may overconstrain an optical element, which can lead to deformations of the element.

For example, FIG. 1 shows a mirror 12 attached to an optical housing 14 by a prior art mount that overconstrains the mirror. The mount includes three tabs 16 coupled to the mirror by flexures 18, three screws 20 that each secures a corresponding tab 16 to the housing 14, a pin-and-hole 22, and a pin-and-slot 24. Three mounting pads (not visible) are positioned between the three tabs 16 and the housing 14. The three screws 20 engage the housing 14 by clamping corresponding tabs 16 to the housing 14, via the intervening mounting pads. Screws 20 thus provide three axial constraints to constrain the mirror within the x-y plane according to the coordinate system of FIG. 1. In other words, the three constraints provided by screws 20 acting in conjunction with the mounting pads of tabs 16 effectively confine the mirror to the two dimensions of the x-y plane, by removing three of the mirror's original six degrees of freedom.

Within the x-y plane, screws 20, pin-and-hole 22, and pin-and-slot 24 function to secure the mirror to the housing. However, these structures overconstrain the mirror because they collectively provide more than three constraints in the x-y plane, whereas the mirror has only three degrees of freedom in that plane. This can be seen in FIG. 2, which is a schematic diagram in which each constraint symbol 25 represents one constraint on mirror 12, relative to housing 14, along the length of the corresponding line. As FIGS. 1 and 2 indicate, pin-and-hole 22 provides two constraints to the mirror in the x-y plane, by restricting motion both radially and tangentially. Pin-and-slot 24 provides another tangential constraint to the mirror, parallel to the x-axis of the mirror in FIG. 2, but does not provide any radial constraint to the mirror because the pin can move relative to the mirror along the y-axis of the mirror. Thus, pin-and-hole 22 can be thought of as constraining the two translational degrees of freedom of the mirror in the x-y plane, and pin-and-slot 24 can be thought of as constraining the rotational degree of freedom of the mirror in the x-y plane (i.e., around the z-axis).

In addition, screws 20 disposed at the 5 o'clock and 7 o'clock positions each provide one additional tangential constraint to the mirror. These screws each provide one constraint to the mirror rather than two, because the flexure 18 between each screw and the mirror provides radial compliance while maintaining the tangential constraint. Although these screws provide constraints to the mirror, they do not provide the advantage of accurately locating the mirror, because of the clearance between the screw threads and the through hole. Screw 20 at the 12 o'clock position (adjacent to pin-and-hole 22) can be viewed as providing no additional constraint because the pin-and-hole has already provided both a tangential constraint and a radial constraint to the mirror at approximately the same location. In any case, the two additional constraints provided by screws 20 disposed at the 5 o'clock and 7 o'clock positions make a total of at least five constraints on the mirror in the x-y plane, so that the design of FIGS. 1 and 2 is overconstrained. As a consequence, any change in the shape of the housing (due to thermal or mechanical stress) will deform the primary mirror, causing astigmatism and poor image quality.

Deformations may be particularly detrimental to optical mirrors, because deformations as small as tenths of microns can degrade optical performance (e.g., by causing astigmatism or wavefront error). Degradation of optical performance can be particularly problematic in optical systems used to create and/or record images of distant objects and scenes. In military applications, however, the requirement that the mirror mount be robust to shock and vibration often leads to deliberately overconstrained designs, despite the typically long standoff ranges, effectively sacrificing image quality in favor of the durability of the optical element mounting system. Accordingly, it would be desirable to provide a mount that is durable while reducing the constraints on the body that may cause deformation.

SUMMARY

The present teachings provide a spatially efficient kinematic mirror mount for mounting a mirror or other optical element to a housing. The kinematic mirror mount may include three spaced-apart constraint structures, positioned at or near the outer perimeter or circumference of the mirror. The constraint structures constrain the mirror to lie within a plane, typically the x-y plane defined by the orientation of the housing, substantially without overconstraining the mirror. To accomplish this, each of the three constraint structures may constrain the mirror in the x-y plane by independently providing exactly one tangential constraint to the mirror. The constraint structures may include a tab, coupled to the mirror by a flexure, and a fastening assembly for securing the tab to the housing.

BRIEF DESCRIPTION OF THE DRAWINGS

FIG. 5 is a sectional view of an exemplary fastening assembly for mounting a mirror to an optical housing, taken generally along line 5-5 in FIG. 3.

FIG. 6 is a sectional view of another exemplary fastening assembly for mounting a mirror to an optical housing.

DETAILED DESCRIPTION

Figure 1:
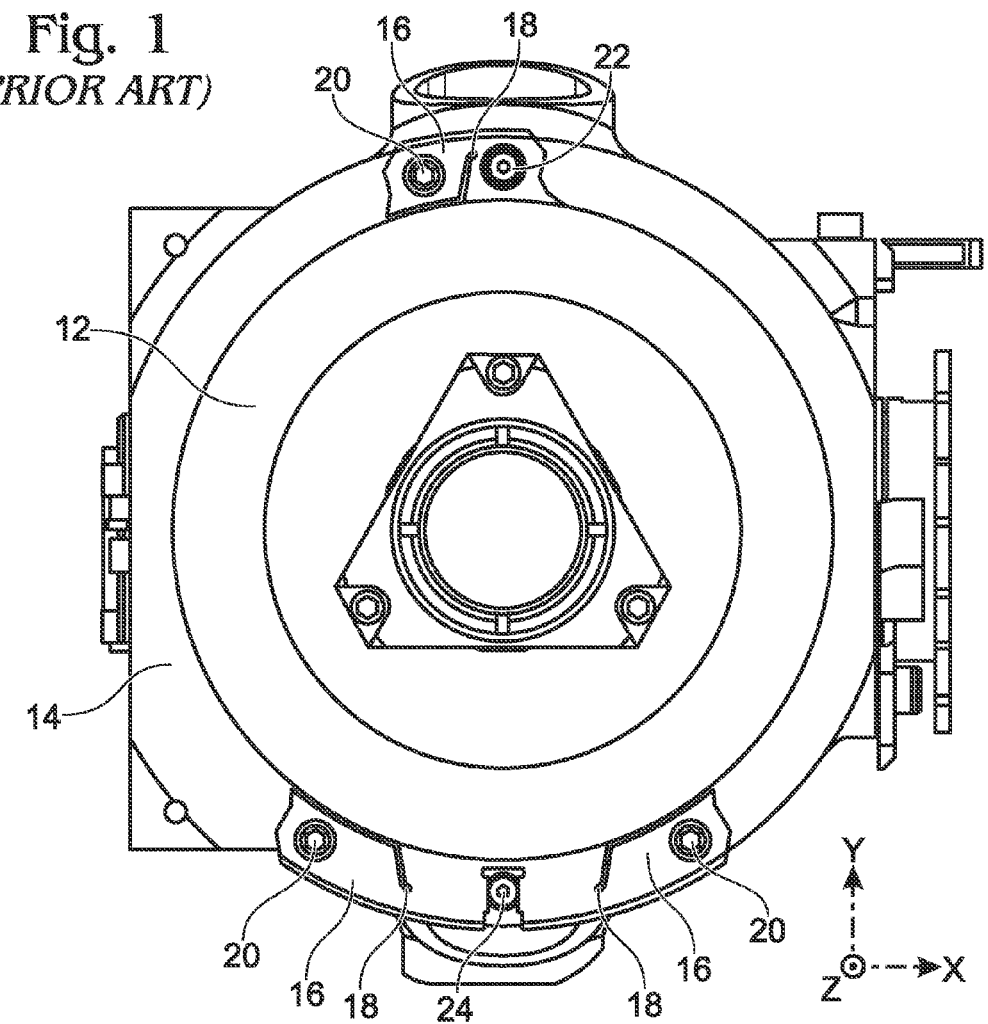
FIG. 1 is a front elevational view of a mirror mounted to an optical housing by a prior art mirror mount that overconstrains the mirror in the x-y plane.

The present teachings provide a spatially efficient kinematic mount for mounting a mirror or other optical element to a housing while reducing the likelihood of deformations caused by overconstraining the element. The mount has a constraining mechanism that may include three spaced-apart constraint structures, positioned at or near the outer perimeter or circumference of the mirror, that are collectively configured to constrain the mirror to lie within a plane defined by the housing. Furthermore, each of the three constraint structures constrains the mirror from moving (i.e., rotating or translating) within the plane by independently providing a tangential constraint to the mirror. Each constraint structure may include a tab coupled to the mirror by a flexure, and a fastening assembly for securing the tab to the housing.

According to the present teachings, shoulder screws may be used to kinematically constrain a mirror. The term "shoulder screw" is used in this disclosure to mean a screw in which the threading stops at some distance from the head of the screw, leaving a smooth shaft above the threading and below the head. Each shoulder screw can be used to provide a clamping force to hold the mirror axially on a pad, i.e., to hold the mirror within a plane. In addition, the shoulder of each shoulder screw is used as a pin that mates with close fitting holes on both the mirror and the optics housing, thus applying two translational constraints to the mirror in the plane of the mirror. However, a flexure between each shoulder screw and the mirror may be configured to provide radial compliance (i.e., to remove one constraint) while still providing a tangential constraint in the plane of the mirror. Thus, each of the three shoulder screws may be used to apply a total of two constraints to the mirror relative to the housing, including exactly one axial constraint and exactly one tangential planar constraint, by holding the mirror in place axially with a clamping force while providing a tangential planar constraint to the mirror.

As an alternative to one or more of the shoulder screws, pins with separate clamping screws may be used to kinematically constrain a mirror without overconstraining the mirror. In this case, each pin provides a tangential planar constraint to the mirror, in conjunction with a flexure, in the same manner as a shoulder screw. Accordingly, a pin will generally be close-fitting within corresponding apertures in the mirror and the housing. However, each pin would not also provide a clamping force. Rather, each clamping screw would be used to provide a clamping force, without also providing an overconstraining additional planar constraint. Accordingly, a clamping screw will generally be loose-fitting within corresponding apertures in the mirror and the housing, to apply substantially only an axial clamping force to the mirror. In this manner, a shoulder screw can effectively be replaced by the combination of a pin and a clamping screw, to apply exactly one axial constraint and exactly one tangential planar constraint to the mirror relative to the housing. The following sections provide more details about mirror mounts contemplated by the present teachings.

A. Overview

Figure 3:
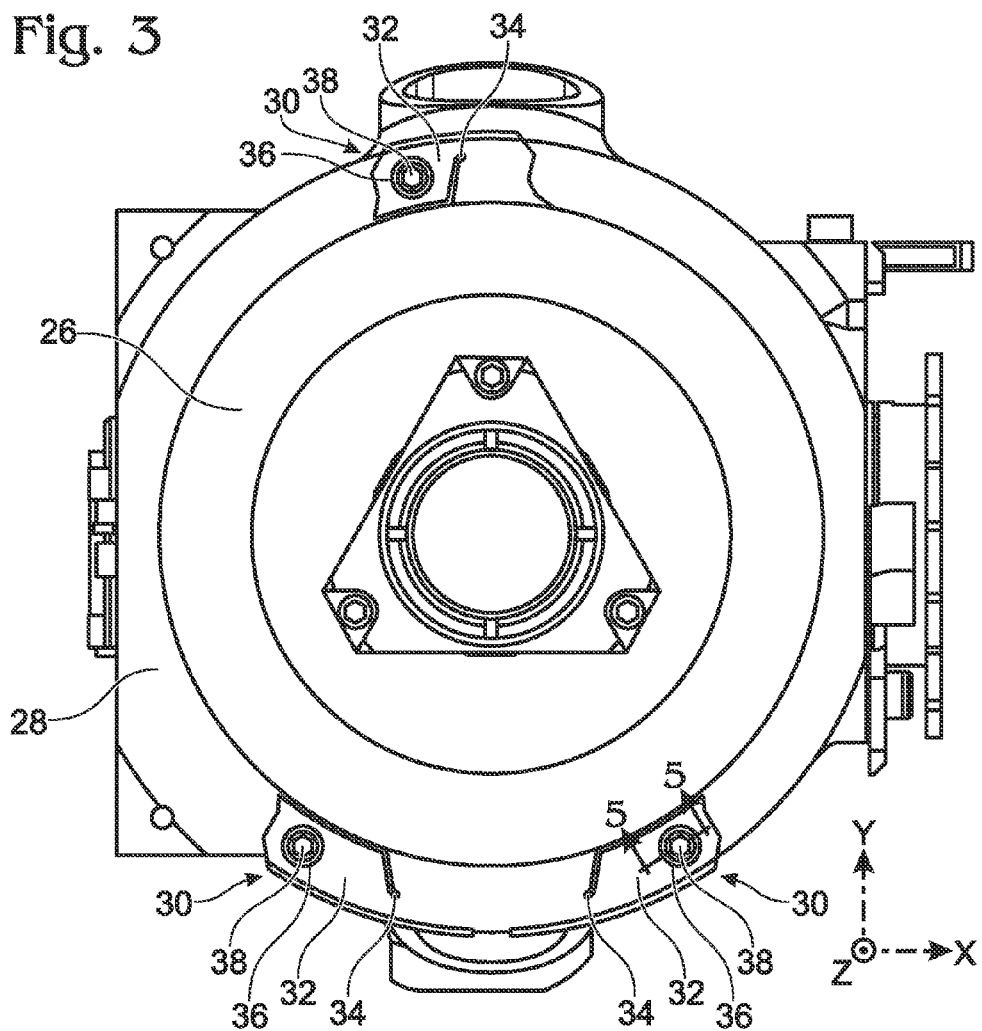
FIG. 3 is a front elevational view of a mirror mounted to an optical housing by a mirror mount that does not substantially overconstrain the mirror in the x-y plane, in accordance with an embodiment of the invention.

FIG. 3 shows a spatially efficient kinematic mirror mount for mounting a mirror 26 or other suitable optic to an optical housing 28, in accordance with aspects of the present teachings. Mirror 26, or other suitable optic, may be any size or shape consistent with its function(s), including but not limited to circular, square, polyhedral, etc. Mirror 26 may be substantially symmetrical, having a center of symmetry and one or more associated axes of symmetry. Mirror 26 may be made of any suitable material consistent with its function(s), including but not limited to aluminum, beryllium, glass, silicon, silicon carbide, etc.

Optical housing 28 may include any suitable housing for an optical system and may be made of any suitable material consistent with its function(s). For example, optical housing 28 may include a fixed support or a gimbal, among others. Examples of optical systems that may utilize an optical housing, such as housing 28, may be found in U.S. Pat. Nos. 5,056,024, 5,572,312, 6,239,924, 7,471,541 and 7,515,767, and U.S. Patent Application Nos. 2006/0071121, 2008/0158679, 2007/0003155 and 2007/0194170, the complete disclosures of which are hereby incorporated by reference in their entireties for all purposes. When mirror 26 is mounted to optical housing 28 as described below, the optical housing is configured to hold the mirror in a substantially fixed orientation relative to the housing.

The kinematic mirror mount of FIG. 3 includes three spaced-apart constraint structures 30, positioned along the outer perimeter or circumference of mirror 26, that together constrain the mirror from translating and rotating relative to housing 28. In the coordinate system shown in FIG. 3, which is fixed to the housing, the three constraint structures together provide three axial constraints that prevent the mirror from translating along the z-axis (i.e., an axis normal to the housing) and rotating about the x and y axes. Thus, constraint structures 30 are collectively configured to constrain mirror 26 to lie substantially within the x-y plane defined by the housing, by removing one translational and two rotational degrees of freedom from the mirror.

Figure 4:
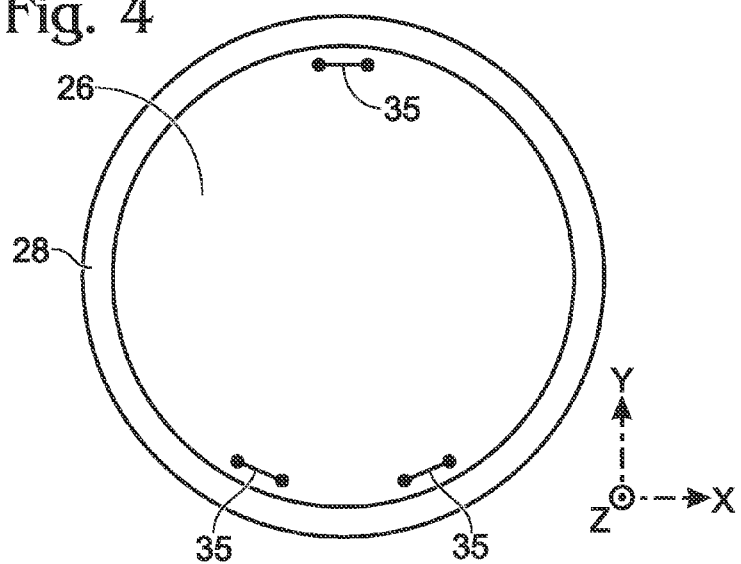
FIG. 4 is a schematic constraint diagram showing constraints within the x-y plane on the mirror of FIG. 3.

In addition to confining mirror 26 within the x-y plane, constraint structures 30 each provide an additional constraint to the mirror in the x-y plane. FIG. 4 is a schematic diagram showing the constraints provided to mirror 26 by structures 30, where each constraint is represented by a constraint symbol 35 and acts along the direction of the line of the corresponding constraint symbol. In the embodiment depicted in FIGS. 3 and 4, each constraint structure is configured to provide exactly one planar constraint to constrain the mirror from moving within the plane defined by the housing. As depicted in FIG. 4, constraints 35 may be substantially tangential constraints, although the constraints may be provided in any direction having a significant tangential component within the plane defined by the housing.

Figure 2:
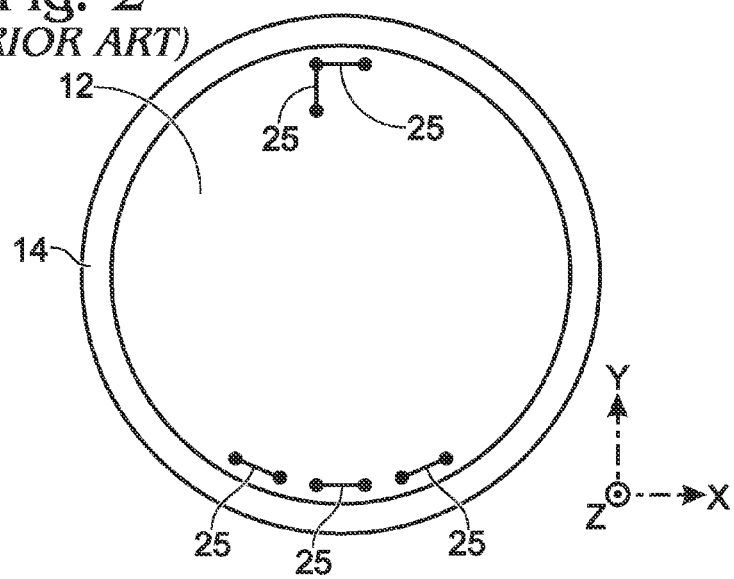
FIG. 2 is a schematic constraint diagram showing constraints within the x-y plane on the mirror of FIG. 1.

As in the case of screws 20 of FIGS. 1 and 2, each constraint structure 30 depicted in FIG. 3 provides one planar constraint to the mirror rather than two, because a flexure 34 disposed between each constraint structure and the mirror allows radial motion of the mirror relative to the housing while substantially preventing tangential motion. In other words, flexures 34 render tabs 32 radially compliant and tangentially noncompliant with respect to mirror 26. Thus, the three constraint structures 30 provide three tangential constraints in the x-y plane, which collectively prevent the mirror from translating along the x and y axes and rotating about the z-axis. Because exactly three constraints are used to constrain the mirror's three degrees of freedom in the x-y plane, mirror 26 of FIGS. 3 and 4 is not overconstrained. This reduces the potential for deformation of the mirror, and concomitant degradation of optical performance of the optical system.

B. Exemplary Constraint Structures

Each constraint structure 30 may include (a) a tab 32 coupled to the mirror 26 by a flexure 34, and (b) a fastening assembly 36 for securing a corresponding tab to the housing 28, as depicted in FIG. 3. Each tab 32 and/or flexure 34 may be integrally formed with the mirror (e.g., cut using electrical discharge machining (EDM), laser, water jet, etc.), to reduce stress in the mirror, and/or coupled to the mirror by any suitable attachment mechanism, such as bonded to a glass mirror, silicon carbide (SiC) mirror, or other type of mirror. Each flexure may be adapted to flex in a known and desired manner within the x-y plane but to provide little or no flex within the x-z or y-z planes. For example, tabs 32 may be coupled to the mirror by flexures 34 such that the tabs are configured to allow radial motion of the mirror relative to the housing while substantially preventing tangential motion of the mirror relative to the housing.

Each fastening assembly 36 may include any suitable structure(s) for constraining a corresponding tab 32 relative to housing 28. Each fastening assembly 36 clamps a corresponding tab 32 to the housing, thereby providing an axial constraint to the corresponding tab, as discussed below. Each fastening assembly 36 also provides one axial constraint to the mirror, because the mirror is coupled to tabs by flexures 34 that provide little or no flex in the x-y and x-z planes. As described previously, the three constraint structures together thus provide three axial constraints that constrain the mirror from translating along the z-axis, and rotating about the x and y axes, relative to the housing.

C. Exemplary Fastening Assemblies

FIGS. 5 and 6 show exemplary fastening assemblies, in the form of shoulder screws, in accordance with aspects of the present teachings. The z-axis depicted in FIGS. 5 and 6 is consistent with the coordinate system of FIGS. 1-4. Each fastening assembly 36 clamps a corresponding tab 32 to the housing 28, and provides various axial, tangential, and/or radial constraints to the corresponding tab, as discussed above. Each fastening assembly 36 may include one or more of a fastener 38, a fastener aperture 40 in the corresponding tab, a complementary fastener aperture 42 in the housing, a Belleville or spring washer 44, and a mounting pad 46. In other words, each tab 32 includes a fastener aperture 40 configured to be aligned with a complementary fastener aperture 42 in housing 28, to form a fastener aperture pair configured to receive a fastener 38. Each aperture pair may be configured to receive various types of fasteners configured to attach the mirror to the housing, as described below, including but not limited to unthreaded pins and shoulder screws that are partially unthreaded.

Fastener 38 may include a first portion 48, such as a shaft portion, and a second portion 50, such as a head portion. First or shaft portion 48 may be dimensioned to fit into and through fastener aperture 40 in its corresponding tab 32 and into complementary fastener aperture 42 in housing 28, and to securely engage complementary fastener aperture 42. First or shaft portion 48 may include one or more of a non-threaded or shoulder portion 52, a threaded portion 54, and a lip 56. In other words, fastener 38 may be at least partially unthreaded. Non-threaded or shoulder portion 52 of fastener 38 may be dimensioned to fit closely within and bear against the internal surface of fastener aperture 40, and in some cases to fit within a portion of complementary fastener aperture 42, such as a non-threaded portion 58. Threaded portion 54 may be dimensioned to fit into and through aperture 40 and into complementary fastener aperture 42 where it can be threadably engaged with a threaded portion 60 of complementary fastener aperture 42. Lip 56 may be formed between non-threaded or shoulder portion 52 and threaded portion 54 of the fastener, and may be formed of an end of the non-threaded shoulder portion that is distal from second or head portion 50.

Second or head portion 50 of fastener 38 may be configured to clamp the mirror to the housing by directly engaging the mirror and compressing it against mounting pad 46. More specifically, head portion 50 may be configured to engage a surface 62 of its corresponding tab 32 adjacent to aperture 40 and distal from housing 28 when first or shaft portion 48 is inserted along the z-axis through fastener aperture 40 and into complementary fastener aperture 42. For example, the second or head portion may be larger and/or wider than fastener aperture 40 in the tab, and may apply an axial clamping force, or a preload, to surface 62 along the z-axis as first or shaft portion 48 is engaged with complementary fastener aperture 42.

Complementary fastener aperture 42 may include one or more of a non-threaded portion 58, a threaded portion 60, and a shelf 64. Non-threaded portion 58 may be dimensioned to receive a portion of fastener 38, such as non-threaded or shoulder portion 48. Threaded portion 60 may be dimensioned to be threadably engaged by threaded portion 54 of the fastener. Shelf 64 may be positioned between the non-threaded and threaded portions of the fastening aperture. In some cases, such as is shown in FIG. 6, lip 56 may be configured to engage shelf 64, which is disposed at a preselected depth within the housing. Thus, engagement of the lip with the shelf prevents the head of the shoulder screw from moving closer to the housing than a preselected distance. In these cases, lip 56 and shelf 64 function together to prevent second or head portion 50 of the fastener from being moved any closer to the housing 28 than the predetermined distance, and thus from applying excessive axial clamping force to tab 32 that may damage mirror 26.

An intermediate force transmitter, such as a spring-biased force transmitter 44, optionally may be disposed between second or head portion 50 of the shoulder screw and corresponding tab 32 of the mirror, as shown in FIG. 6. The intermediate force transmitter, typically a Belleville or spring washer, may be configured to apply a predetermined force to the mirror. Force transmitter 44 may function together with the second or head portion of the fastener to apply the axial clamping force, or preload, along the z-axis to the corresponding tab. Force transmitter 44 may include any suitable structure configured to apply a predetermined force to the mirror, including but not limited to a Belleville-type compressible washer. Other force transmitters having a known response to a compressive force also may be suitable. As described above, when lip 56 "bottoms out" against shelf 64, fastener 38 may be configured such that head portion 50 is disposed at a known distance from tab 32. Thus, force transmitter 44 may be chosen to provide any desired clamping force to the tab.

Mounting pad 46 may be positioned between the tab and the housing, and may provide a cushion against which a corresponding tab 32 is clamped by fastener 38, so as to minimize the possibility of damage to mirror 26 from direct contact with tab 32. Specifically, as fastener 38 is engaged with complementary fastener aperture 42, second or head portion 50 applies a clamping force to surface 62 of its corresponding tab 32, thereby clamping the tab against mounting pad 46, and constraining the tab axially.

When fully assembled, each of fastening assemblies 36 described above provides an axial constraint to corresponding tab 32. More specifically, as shown in FIGS. 5 and 6, second or head portion 50 of fastener 38, either alone or in combination with force transmitter 44, applies an axial clamping force, or preload, to surface 62 along the z-axis that clamps the tab to housing 28 and/or mounting pad 46. This axial clamping force constrains tab 32 from translating along the z-axis and thus prevents the mirror from rotating around the x-axis or y-axis relative to the housing. In other words, fastening assemblies confine the mirror to the x-y plane of the housing.

The appropriate amount of clamping force, or preload, may be (a) estimated during engagement of the fastener with the fastening aperture, (b) gauged by using a torque wrench or other suitable tool according to predetermined specifications, or (c) substantially preselected by providing a lip 56 and shelf 64 that function together to prevent second or head portion 50 of the fastener from moving any closer to housing 28 than a predetermined distance, as described above. Using fasteners to clamp all three tabs to the corresponding mounting pads provides three axially constraints that prevent the mirror form translating along the z-axis and rotating about the x and y axes.

Each of fully assembled fastening assemblies 36 also provides a constraint to corresponding tab 32 within the x-y plane. Specifically, first or shaft portion 48 of each fastener 38 fits within and bears against the internal surface of fastener aperture 40, thereby preventing the tab from translating within the x-y plane in a direction tangential to the circumference of the mirror, as depicted in FIG. 4. Because flexure 34 provides radial compliance between the tab and the mirror, as described above, fastening assemblies 36 do not provide substantial radial constraints to the mirror. Thus, the three fastening assemblies function together, along with the flexures, to provide only three constraints to the mirror in the x-y plane. These constraints prevent the mirror form translating along the x- and y-axes and from rotating about the z-axis without overconstraining the mirror.

Exemplary fastening assemblies 36 shown in FIGS. 5 and 6 each provide a planar constraint to corresponding tab 32, because the dimensions of the substantially smooth surface of non-threaded or shoulder portion 52 of fastener 38 are configured to conform closely to the dimensions of the internal surface of fastener aperture 40. Unlike a screw with a fully threaded shaft, the close conformity between the dimensions of non-threaded or shoulder portion 52 of fastener 38 and the internal surface of fastener aperture 40 affords little or no clearance between the fastener and the aperture, which prevents the mirror from vibrating or moving substantially under shock and vibration. Thus, fastener 38 acts much like an unthreaded pin, while also providing an axial clamping force to the mirror.

Figure 7:
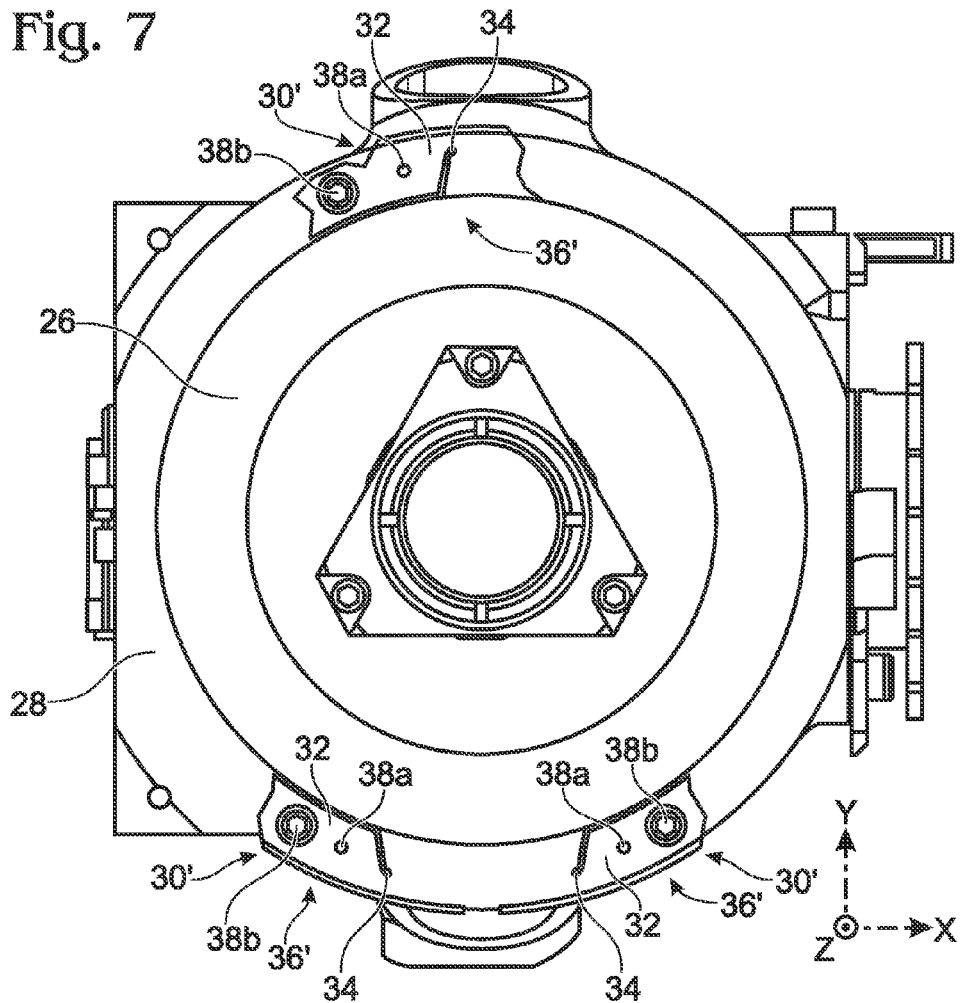
FIG. 7 is a front elevational view of a mirror mounted to an optical housing by another mirror mount that does not substantially overconstrain the mirror in the x-y plane, in accordance with an embodiment of the invention.

FIG. 7 depicts another kinematic mirror mount for mounting a mirror 26 or other suitable optic to an optical housing 28, in accordance with aspects of the present teachings. The mirror mount shown in FIG. 7 is similar to the mount shown in FIG. 3, except that each shoulder screw 38 depicted in FIG. 3 has been replaced by the combination of a pin 38a and a clamping screw 38b in FIG. 7. More specifically, each of the three constraint structures 30' of the mount shown in FIG. 7 includes a fastening assembly 36' having a close-fitting pin 38a configured to provide a tangential planar constraint to the mirror, and a loose-fitting clamping screw 38b configured to provide an axial constraint to the mirror. Each of pins 38a is configured to fit closely within a fastener aperture pair including a fastener aperture in the mirror and a complementary fastener aperture in the housing, and each of clamping screws 38b is configured to fit loosely within a clamping screw aperture pair including a clamping screw aperture in the mirror and a complementary clamping screw aperture in the housing.

As described previously, the combination of a pin and clamping screw depicted in FIG. 7 can be configured to apply exactly one axial constraint and exactly one tangential planar constraint to the mirror relative to the housing, so that the three constraint structures 30' adequately fix the position of mirror 26 relative to housing 28, without overconstraining the mirror. Naturally, the present teachings also contemplate embodiments that include various combinations of shoulder screws, pins and clamping screws, such as a single shoulder screw and two pin/clamping screw assemblies, or two shoulder screws and one pin/clamping screw assembly. Each of these configurations may be used to apply exactly six spatial constraints to a mirror relative to an optical housing.

D. Exemplary Mounting Methods

Figure 8:
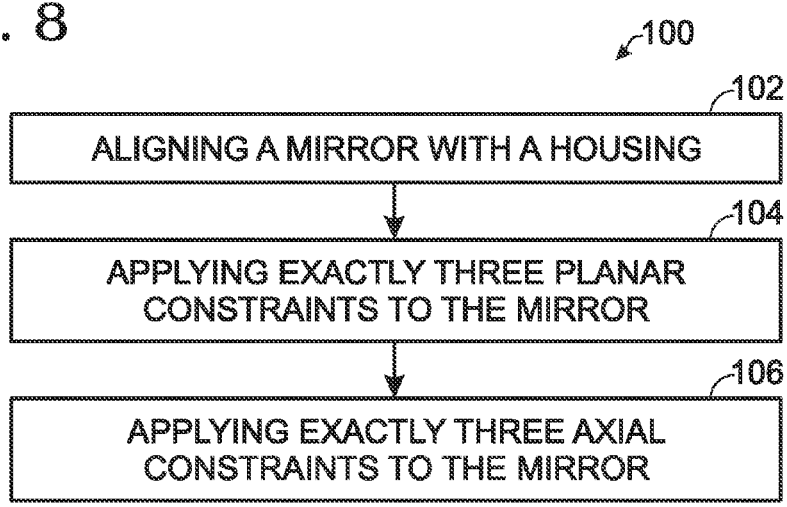
FIG. 8 is a flowchart of a method of mounting a mirror to an optical housing, in accordance with an embodiment of the invention.

The present teachings further contemplate methods of mounting a mirror to an optical housing without overconstraining the mirror. For example, FIG. 8 depicts an exemplary method, generally indicated at 100, of mounting a mirror to an optical housing. Method 100 includes aligning a mirror with an optical housing at step 102. This typically involves aligning fastener apertures in the mirror with complementary fastener apertures in the housing. At step 104, exactly three planar constraints are applied to the mirror to constrain the mirror from moving within the plane defined by the housing. At step 106, exactly three axial constraints are applied to the mirror to constrain the mirror to lie substantially within a plane defined by the housing.

Both the axial constraints and the planar constraints, which may be tangential planar constraints, may be applied by attaching the mirror to the housing with suitable constraint structures of the type described previously. For example, applying the axial and planar constraints may include clamping the mirror to the housing with exactly three shoulder screws, each of which is configured to provide exactly one axial constraint and exactly one tangential planar constraint to the mirror relative to the housing, in conjunction with an underlying mounting surface such as a pad. Similarly, applying the constraints may include applying the axial constraints by clamping the mirror to the housing with exactly three loose-fitting clamping screws, and applying the planar constraints by fixing the planar orientation of the mirror relative to the housing with exactly three close-fitting pins. Thus, method 100 may be used to mount a mirror to an optical housing without overconstraining the mirror and risking the related undesirable effects on image quality.

The present disclosure contemplates apparatus and methods suitable for mounting a mirror to an optical housing in an optical instrument, substantially without overconstraining the mirror. The disclosure set forth above may encompass multiple distinct inventions with independent utility. The disclosure relates information regarding specific embodiments, which are included for illustrative purposes, and which are not to be considered in a limiting sense, because numerous variations are possible. The inventive subject matter of the disclosure includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

I claim:

1. A mirror mount, comprising:
    an optical housing; and
    a constraining mechanism configured to hold a mirror in a substantially fixed orientation relative to the housing, the constraining mechanism consisting essentially of three constraint structures integrally formed with the mirror, each configured to apply exactly one axial constraint and exactly one tangential planar constraint to the mirror relative to the housing, wherein the mirror and constraint structures comprise a single piece of material.

2. The mirror mount of claim 1, wherein each constraint structure includes a loose-fitting clamping screw configured to apply the axial constraint, and a pin configured to apply the tangential planar constraint.

3. The mirror mount of claim 1, wherein each constraint structure includes a shoulder screw configured to apply both the axial constraint and the tangential planar constraint.

4. The mirror mount of claim 3, wherein each shoulder screw is configured to apply a clamping force to the mirror by directly engaging the mirror.

5. The mirror mount of claim 3, wherein each shoulder screw is configured to apply a clamping force to the mirror by engaging a spring-biased force transmitter disposed between the shoulder screw and the mirror.

6. The mirror mount of claim 5, wherein the force transmitter is a Belleville-type washer.

7. The mirror mount of claim 3, wherein a shaft of each shoulder screw includes a lip configured to engage a shelf disposed at a preselected depth within the housing, wherein engagement of the lip with the shelf prevents a head of the shoulder screw from moving closer to the housing than a preselected distance, and wherein each shoulder screw is configured to clamp the mirror to the housing by engaging a Belleville-type washer configured to apply a predetermined force to the mirror.

8. The mirror mount of claim 1, wherein each constraint structure includes a radially compliant and tangentially noncompliant tab attached to the mirror, and each tab includes a fastener aperture configured to be aligned with a complementary fastener aperture in the housing to form a fastener aperture pair.

9. The mirror mount of claim 8, wherein each fastener aperture pair is configured to receive a shoulder screw.

10. The mirror mount of claim 8, wherein each fastener aperture pair is configured to receive a close-fitting pin, wherein each constraint structure further includes a clamping screw aperture configured to be aligned with a complementary clamping screw aperture in the housing to form a clamping screw aperture pair, and wherein each clamping screw aperture pair is configured to receive a loose-fitting clamping screw.

11. The mirror mount of claim 8, wherein the tabs are integrally formed with the mirror.

12. A method of mounting a mirror to an optical housing, comprising:
    aligning a mirror with an optical housing;
    applying exactly three planar constraints to constrain the mirror from moving within the plane defined by the housing; and
    applying exactly three axial constraints to constrain the mirror to lie substantially within a plane defined by the housing;
    wherein applying the constraints is performed with a constraining mechanism configured to hold the mirror in a substantially fixed orientation relative to the housing, the constraining mechanism consisting essentially of three constraint structures integrally formed with the mirror, each configured to apply exactly one axial constraint and exactly one tangential planar constraint to the mirror relative to the housing, and wherein the mirror and constraint structures comprise a single piece of material.

13. The method of claim 12, wherein applying the axial and planar constraints consists essentially of attaching the mirror to the housing with exactly three constraint structures, each constraint structure configured to apply exactly one axial constraint and exactly one tangential planar constraint to the mirror relative to the housing.

14. The method of claim 13, wherein each constraint structure includes a loose-fitting clamping screw configured to apply the axial constraint, and a pin configured to apply the tangential planar constraint.

15. The method of claim 13, wherein each constraint structure includes a shoulder screw configured to apply both the axial constraint and the tangential planar constraint.

16. The method of claim 15, wherein each shoulder screw is configured to apply a clamping force to the mirror by directly engaging the mirror.

17. The method of claim 15, wherein each shoulder screw is configured to apply a clamping force to the mirror by engaging a Belleville-type washer disposed between the shoulder screw and the mirror.

18. The method of claim 13, wherein each constraint structure includes a radially compliant and tangentially noncompliant tab attached to the mirror, and each tab includes a fastener aperture configured to be aligned with a complementary fastener aperture in the housing to form a fastener aperture pair.

19. The method of claim 18, wherein each fastener aperture pair is configured to receive a shoulder screw.

20. The method of claim 18, wherein each fastener aperture pair is configured to receive a close-fitting pin, wherein each constraint structure further includes a clamping screw aperture configured to be aligned with a complementary clamping screw aperture in the housing to form a clamping screw aperture pair, and wherein each clamping screw aperture pair is configured to receive a loose-fitting clamping screw.

* * * * *